(12) United States Patent
Barefoot et al.

(10) Patent No.: US 8,497,907 B2
(45) Date of Patent: Jul. 30, 2013

(54) OFF ROAD VEHICLE VISION ENHANCEMENT SYSTEM

(75) Inventors: Galen Lee Barefoot, Midland, VA (US); Thomas O'Neill, Arlington, VA (US)

(73) Assignee: Mobility Solutions Innovation Inc., Arlington, VA (US)

( * ) Notice: Subject to any disclaimer, the term of this patent is extended or adjusted under 35 U.S.C. 154(b) by 633 days.

(21) Appl. No.: 12/654,133

(22) Filed: Dec. 11, 2009

(65) Prior Publication Data

US 2011/0141281 A1    Jun. 16, 2011

(51) Int. Cl.
- H04N 7/18 (2006.01)
- H04N 7/00 (2011.01)
- G06K 9/00 (2006.01)

(52) U.S. Cl.
USPC ............... 348/148; 348/36; 348/37; 348/151; 382/104

(58) Field of Classification Search
USPC ............... 348/148, 36, 39, 118, 151
See application file for complete search history.

(56) References Cited

U.S. PATENT DOCUMENTS

| | | | |
|---|---|---|---|
| 2,938,937 A | 5/1960 | Shenk | |
| 3,689,695 A | 9/1972 | Rosenfield et al. | |
| 4,288,814 A | 9/1981 | Talley et al. | |
| 4,696,954 A | 9/1987 | Pritchard et al. | |
| 4,910,591 A | 3/1990 | Petrossian et al. | |
| 5,027,200 A * | 6/1991 | Petrossian et al. | 348/118 |
| 5,121,200 A * | 6/1992 | Choi | 348/148 |
| 5,876,005 A * | 3/1999 | Vasconi | 248/276.1 |
| 6,026,135 A | 2/2000 | McFee et al. | |
| 6,333,759 B1 * | 12/2001 | Mazzilli | 348/148 |
| 6,580,373 B1 * | 6/2003 | Ohashi | 340/901 |
| 6,793,416 B2 | 9/2004 | Peterson et al. | |
| 6,911,997 B1 * | 6/2005 | Okamoto et al. | 348/148 |
| 8,139,109 B2 * | 3/2012 | Schmiedel et al. | 348/118 |
| 2002/0130953 A1 * | 9/2002 | Riconda et al. | 348/115 |
| 2003/0103142 A1 * | 6/2003 | Hitomi et al. | 348/148 |
| 2003/0122929 A1 * | 7/2003 | Minaudo et al. | 348/148 |
| 2003/0202097 A1 * | 10/2003 | Kallhammer et al. | 348/148 |
| 2004/0056955 A1 * | 3/2004 | Berberich et al. | 348/148 |
| 2004/0196368 A1 * | 10/2004 | Asai | 348/148 |
| 2006/0171704 A1 * | 8/2006 | Bingle et al. | 396/419 |
| 2008/0043105 A1 * | 2/2008 | Kallhammer et al. | 348/148 |
| 2009/0231430 A1 * | 9/2009 | Buschmann et al. | 348/148 |

OTHER PUBLICATIONS

Total Vision Products, "Racing and Off-Road systems" 6 pages http://www.totalvisionproducts.com/products/racing.html.

* cited by examiner

*Primary Examiner* — Hua Fan
*Assistant Examiner* — Joe Chacko
(74) *Attorney, Agent, or Firm* — Galen Barefoot

(57) ABSTRACT

The disclosed Off-Road Vehicle Vision Enhancement System is for all terrain vehicles operating in extreme off road environments. When an all terrain vehicle is operating in areas where there are large obstacles to traverse the operator needs to be able to maneuver the vehicle over the obstacles with the utmost of care and precision. The operator needs to be able to see the precise placement of the wheels over the obstacles to achieve optimum ground clearance and avoid getting hung-up. The Off-Road Vision Enhancement System includes a retractable protective housing located under the vehicle containing cameras which communicate to the operator the precise relationship of his wheels traversing the obstacles. The retractable housing is designed for simple operation, maximum protection of the cameras and self cleaning of accumulated debris.

16 Claims, 5 Drawing Sheets

OFF ROAD VEHICLE VISION ENHANCEMENT SYSTEM

BACKGROUND OF THE INVENTION

This invention relates generally to devices for viewing from vehicles such as personnel carriers, trucks, or the like designed to operate in all terrain conditions. The invention is more particularly concerned with video camera and viewing screen systems which can provide a driver or other vehicle operator a view of the terrain conditions underneath the vehicle.

Conventionally, the vehicle operator of personnel carriers, trucks, or the like vehicles designed to operate in all terrain conditions must be able to maneuver the vehicle over large obstacles like boulders. To accomplish this, the operator must be able to accurately place the wheels of the vehicle upon the obstacle to achieve maximum ground clearance and avoid being hung-up. With smaller all terrain vehicles and considerable experience the operator can accomplish this. However as vehicles get larger and the terrain gets more hazardous with other distractions, such as in combat situations, the operator can have a difficult time navigating the hostile terrain. Such vehicles must operate in multiple theaters such as high speed travel over open dirt fields and sandy terrain and often muddy conditions. During such high speed travel there is lots of debris thrown against the underside of the vehicle. Other times there is extreme mountains terrain where large obstacles are encountered and travel is slow and extreme attention must be played to the terrain traversed. In these latter conditions a second pair of eyes is often needed external to the vehicle to assist the operator. In hostile environments where there may be enemy fire this is an unacceptable solution. Also in combat situations the vehicle can be subject to explosions and weapons fire.

A number of proposals have appeared in recent times for supplementing a vehicle operator's view by use of a video camera mounted somewhere on the vehicle. These have generally involved mounting video cameras in box-like housings carried on arms that project from the vehicle. Typical of these are the arrangements described in U.S. Pat. Nos. 5,027,200; 4,910,591; and 3,689,695. A camera arrangement for guiding a tractor or other farm vehicle is described in U.S. Pat. No. 4,288,814. U.S. Pat. No. 6,793,416 discloses a system and method for cleaning an optical device in a hostile environment. A camera system is mounted in a protective mounting structure which may be unitary or comprise layers of material. The camera lens is covered by a scratch resistant cover and is cleaned by user operated bursts of air when debris obstructs the view of the camera. These previous proposals do not suggest a solution to the problems encountered by a vehicle in the above stated hostile environments.

A company, Total Vision Products, LLC 625 W. Plata Street Tucson, Ariz. 85705 has developed a camera system for off road vehicles that permits the operator to view the placement of his wheels on obstacles for proper traversing of harsh terrain. This system places multiple cameras underneath the vehicle in view of the wheel locations. The driver is than provided with screens to view the terrain underneath the vehicle. This system does not solve the problems of being able to protect the cameras and operate a vehicle where high speed travel is required over harsh terrain and exposure to combat situations while being able to deploy the camera to view the wheel placement during traversing large obstacles and still providing protection.

OBJECTS AND SUMMARY OF THE INVENTION

It is an object of this invention to provide a video viewing arrangement for vehicles, which avoids the drawbacks and disadvantages of conventional systems in harsh conditions.

Preferably, the camera assembly is mounted at a location underneath the vehicle to provide views of the front and rear wheels.

According to an aspect of this invention, the Off Road Vision Enhancement System includes a retractable protective housing located under the vehicle containing cameras which communicate to the operator the precise relationship of his wheels traversing the obstacles. The retractable housing is designed for simple operation, maximum protection of the cameras and self cleaning of accumulated debris.

The protective housing includes a protective outer shell that is armored to deflect debris kicked up by the wheels at high speed or certain explosions or weapons fire that may occur during operation in hostile combat conditions. The protective housing includes hinged doors that protect the internal camera housing when retracted and also operated to scrape the internal camera housing windows of debris when in the process of retracting. The window of the internal camera housing is made of armored clear material. Between the protective outer shell and the internal retractable camera housing is placed shock absorbing material that acts as a further protection to the cameras and also act as a guide for the housing as it extends and retracts. The cameras used are multi functioning and capable of daylight and night vision. The retraction mechanism can be various types of powered systems including but not limited to hydraulic actuators, mechanical screw types or other similar powered arrangements operable remotely by the vehicle operator. Preferably the retraction mechanism is a simple spring and cable system operated by a lever adjacent the vehicle operator.

Inside the vehicle, the cameras are connected to viewing devices, where multiple views of the underside of the vehicle are produced. Preferably, there are multi views available on one or more screens, e.g. liquid crystal displays, integrated into a dashboard display that includes other instrumentation or separately mounted in clear view of the operator. Alternatively, the display arrangement could be conventional "heads-up displays" that would be viewed by the operator on the interior of the windshield.

The whole Off-Road Vehicle Vision Enhancement System is very simple in construction and operation and will be easy to maintain and install in the field if necessary.

The above and many other objects, features, and advantages of this invention will become apparent from the ensuing description of a preferred embodiment of this invention, when read in conjunction with the accompanying Drawing.

DETAILED DESCRIPTION OF THE PREFERRED EMBODIMENTS

Figure 1:
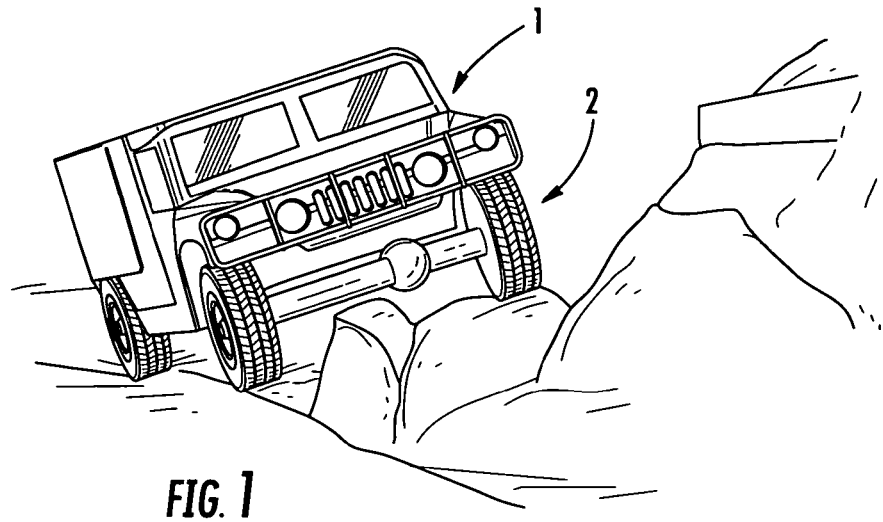
FIG. 1 is a perspective view of a vehicle operating in an off-road environment.
Figure 2:
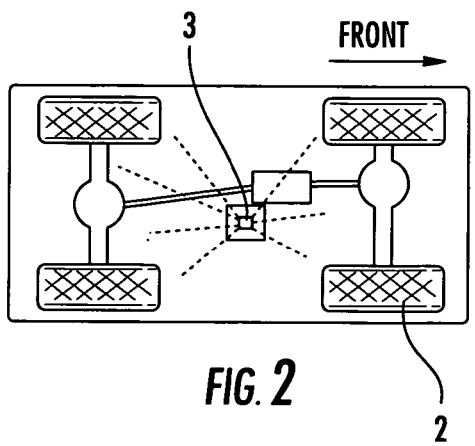
FIG. 2 is an underneath view of the vehicle showing locations of camera housings.

The disclosed Off-Road Vehicle Vision Enhancement System is for all terrain vehicles 1 operating in extreme off road environments (see FIG. 1). When an all terrain vehicle is operating in areas where there are large obstacles to traverse the operator needs to be able to maneuver the vehicle over the obstacles with the utmost of care and precision. The operator needs to be able to see the precise placement of the wheels over the obstacles to achieve optimum ground clearance and avoid getting hung-up. A second pair of eyes is often needed external to the vehicle to assist the operator. In hostile environments where there may be enemy fire this is an unacceptable solution. Also in combat situations the vehicle can be subject to explosions that create extreme heat and shock to the underside of the vehicle and weapons fire. FIG. 2 is an underneath view of the vehicle showing the location of the Off-Road Vision Enhancement System 3 of this invention. The camera assembly is mounted at a location underneath the vehicle to provide views of the front and rear wheels.

The Off-Road Vision Enhancement System 3 includes a retractable protective housing 25 located under the vehicle 1 containing cameras 15,16 which provide the operator with a view from underneath the vehicle of the front and rear wheels and their precise relationship to the terrain/obstacles under the vehicle. Depending on the size of the vehicle more than on System 3 may be required of more than two cameras can be located within the retractable housing 25. The retractable housing 25 is designed for simple operation, maximum protection of the cameras and self cleaning of accumulated debris.

Figure 5:
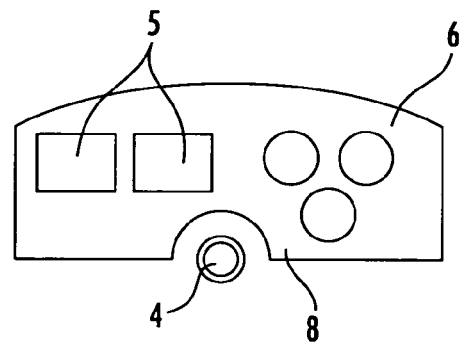
FIG. 5 illustrates an in-dashboard integrated viewing screen and instrument cluster arrangement.
Figure 6:
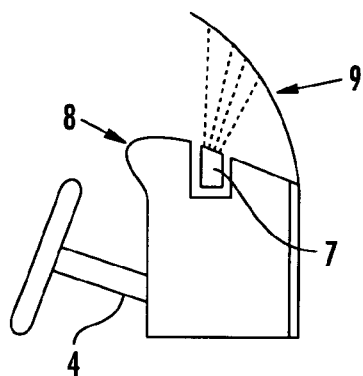
FIG. 6 shows a heads-up display configuration.

The cameras 15,16 are such that they are shock resistant mounted in the internal camera housing, image stabilized, and can be either or both day light and night vision capable. The cameras send a video signal to the operator area of the vehicle 1 and are displayed on the dashboard 8 in front of the operator steering means 4. The displays can be standard monitor type screens of the LCD type and be either color or black and white. The screens 5 can be integrated into the dashboard 8 along with the other conventional instrumentation. Instead of the integrated viewing arrangement 5 of FIG. 5, a conventional "heads up" display 7 (which is reflected on the windshield 9) could be employed as shown in FIG. 6. As a further alternative, an overhead display arrangement could be used where the screens 5 are merely attached to the windshield frame above the normal viewing area of the operator.

Figure 3:
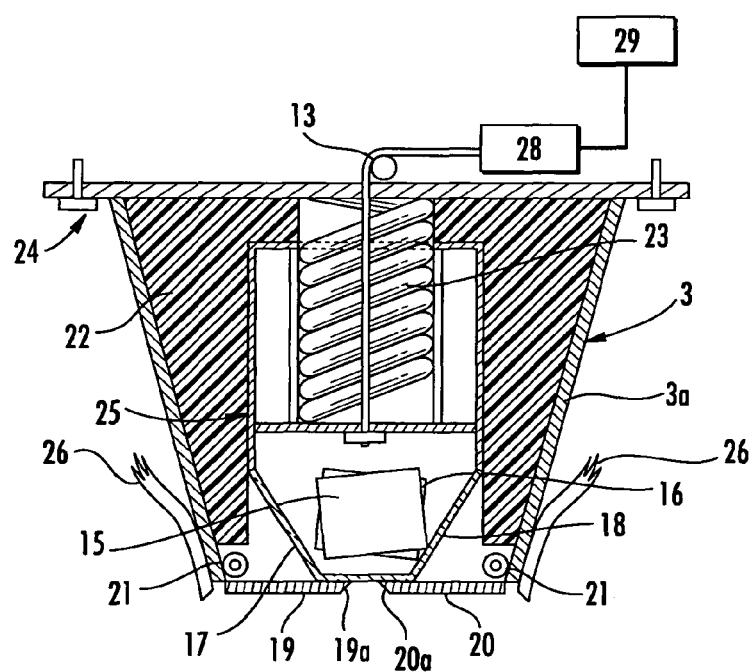
FIG. 3 is a detailed view the of camera housing in the retracted position.
Figure 8A:
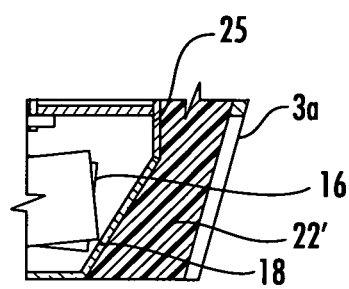
FIGS. 8a and 8b are enlarged views of the protective cover of the internal camera housing.
Figure 8B:
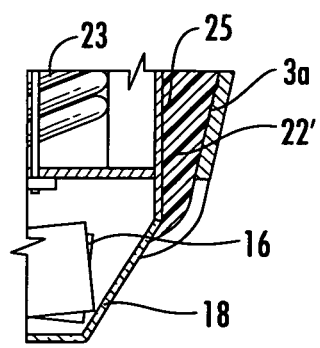

The Off-Road Vision Enhancement System 3 includes an external protective housing 3a that is armored (made of heavy metal or high strength carbon fiber material) to deflect debris kicked up by the wheels 2 at high speed or certain explosions or weapons fire that may occur during operation in hostile combat conditions. The external protective housing 3a is mounted to the under surface of the vehicle 1 with connectors 24 that may be bolts, screws, welding or adhesives. The external protective housing 3a includes hinged doors 19,20 that protect the internal camera housing when retracted and also include an edge 19a,20a respectively that operate to scrape the internal camera housing windows 17,18 of debris when in the process of retracting. The doors 19, 20 are biased against the camera housing 25 and windows 17, 18 by biased hinges 21. As an alternative the doors 19,20 can be replaced by extending the resilient core material 22' as shown in FIG. 8a over the side of the internal camera housing 25 and windows 17, 18. When the internal camera housing 25 is extended as shown in FIG. 8b the resilient core material 22' will be pushed away and slide along the windows 17, 18. With the arrangement shown in FIGS. 8a, 8b the shape of the core 22' forms a protective position for the internal camera housing 25 while also keeping the windows 17, 18 clean and protected. Also for the purposes of cleaning, hoses 26 can be included that spray window washer fluid or high pressure air on the windows 17, 18 to further keep them clear of debris during operation. Only the ends of the hoses 26 have been shown for simplicity, but the hoses would be conventionally connected to a source of pressurized fluid or air not shown. The windows 17, 18 of the internal camera housing 25 are made of armored clear material. The internal camera housing 25 is guided in its retracting motion by a guide 22a. Between the external protective housing 3a and the internal retractable camera housing 25 is placed a shock absorbing and fire retardant core 22 that acts as a further protection to the cameras 15, 16 and also forms the surface of the guide 22a for the internal camera housing as it extends and retracts. Such materials for the core 22 are described by but not limited to dense foam materials or compositions of rubber. Such a foam material is described by U.S. Pat. No. 4,696,954 which is a thermally stable and high impact resistant structural polyurethane foam. An example of a rubber type compound would be as described in U.S. Pat. No. 2,938,937 which describes a rubber type material that is flame resistant and high impact resistant and excellent bonding to metals. Alternatively the core 22 could be replaced by guide rails. The internal camera housing 25 is retractably mounted within said external protective housing 3a in such a way as disclosed above, that it forms a protected position where the internal camera housing 25 is protected from shocks, debris and heat as shown in FIG. 3.

Figure 4:
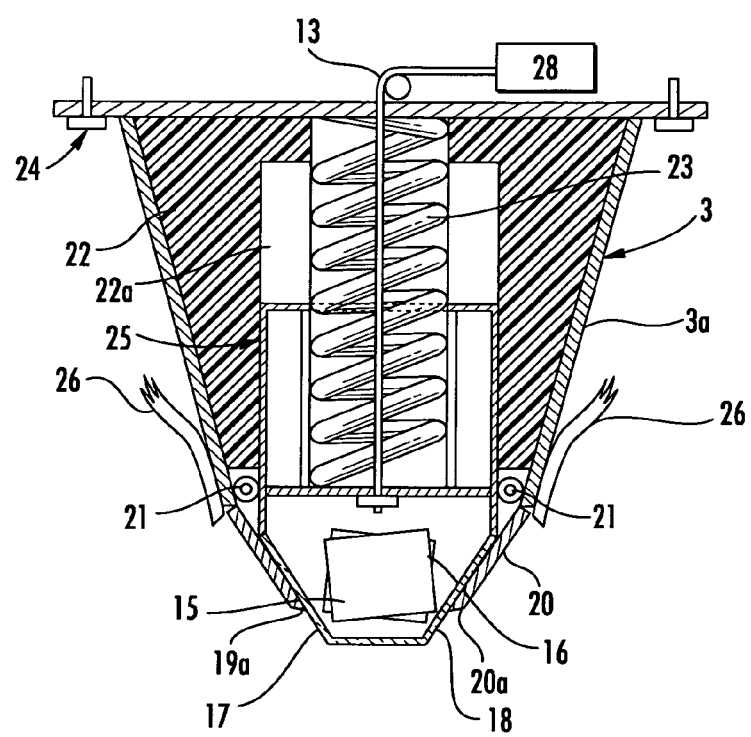
FIG. 4 is a detailed view of the camera housing in the deployed position.
Figure 7:
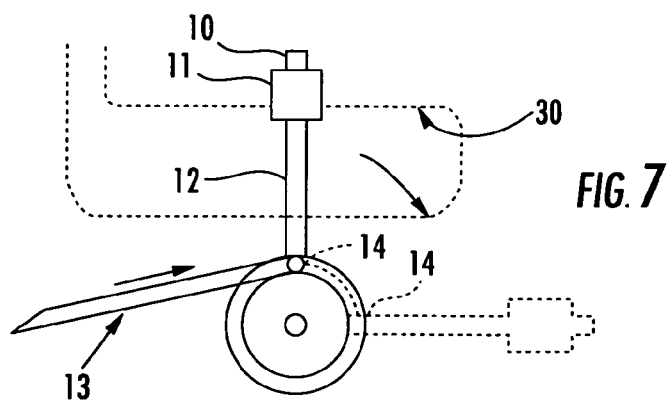
FIG. 7 is view of the preferred operating mechanism for the retractable camera housing.

The internal camera housing 25 is connected to a retraction cable 13 that is connected to an actuator 28. The internal camera housing 25 is biased to an extended operating position as shown in FIG. 4 by means of a spring 23. This spring 3 further functions to provide the internal camera housing with cushioning arrangement. Should the bottom of the housing 25 be struck by a rock this cushioning provided by spring 23 would further protect the cameras 15, 16 and their housing 25. The retraction mechanism 28 can be multiple types of powered systems including but not limited to hydraulic actuators, mechanical screw types or other similar powered arrangements with an operational control 29 operated by the vehicle operator (e.g. a forward and reverse switch). Preferably extending and retracting of the camera housing is accomplished by spring 23 and cable 13 operated by a lever 12 adjacent the vehicle operator seat 30 as shown in FIG. 7. The lever 12 has a handle 11 with a release button 10 that through a simple detent or pawl locks the lever in its upright camera housing extended position or horizontal (dotted image) in its camera housing retracted position. With the handle in an upright position it acts as a "flag" to alert the vehicle operator that the camera housing is extended to its operation position as shown in FIG. 4.

The whole Off-Road Vehicle Vision Enhancement System is very simple in construction and operation and will be easy to maintain and install in the field if necessary.

While this invention has been described in detail with reference to a few selected embodiments, it should be understood that the invention is not limited to those precise embodiments. Rather, many modifications and variations would present themselves to those of skill in the art without departing from the scope and spirit of this invention, as defined in the appended claims.

The invention claimed is:

1. An Off Road Vision Enhancement System for a multi-wheeled vehicle having front and rear wheels comprising:
   an external protective housing with means to connect it to the under surface of the vehicle;
   an internal camera housing retractably mounted within said external protective housing;
   at least one camera located within the internal camera housing adjacent a window in said internal camera housing
   an actuating means for moving the internal camera housing from a retracted position where it is protected within said external protective housing to an extended operational position where said cameras can view the relative position of the front and rear wheels of said vehicle and the terrain underneath said vehicle over which said front and rear vehicle wheels are traversing;
   protection means connected to said external protective housing to protect said internal camera housing from shocks, debris and heat that includes a resilient shock resistant, heat resistant material bonded to an internal surface of the external housing which is able to withstand the heat of fire and explosions that forms a guide and shock absorption shield for said internal camera housing, the protection means further includes means to cover at least a portion of said internal camera housing in the retracted position to further protect the internal camera housing from the harsh environment underneath the vehicle and said protection mean further includes a cushion means between said internal camera housing and another internal surface of the external protective housing; and
   a display means located within said vehicle for the displaying images sent by said at least one camera, such that an operator of the vehicle can properly maneuver said vehicle with the precise placement of the front and rear wheels on an obstacle, which is needed for efficient harsh terrain travel.

2. In an Off Road Vision Enhancement System for a multi-wheeled vehicle as set forth in claim 1 and further comprising:
   said at least one camera is a night vision camera.

3. In an Off Road Vision Enhancement System for a multi-wheeled vehicle as set forth in claim 1 and further comprising:
   said actuating means includes a cable connected to said internal camera housing and to an operator actuated means inside said vehicle.

4. In an Off Road Vision Enhancement System for a multi-wheeled vehicle as set forth in claim 1 and further comprising:
   said actuating means includes a spring located between said external protective housing and said internal camera housing that biases said internal camera housing to move from said protected position to said extended operational position.

5. In an Off Road Vision Enhancement System for a multi-wheeled vehicle as set forth in claim 3 and further comprising:
   said actuating means further includes a spring located between said external protective housing and said internal camera housing, surrounding said cable and biases said internal camera housing to move from said protected position to said extended operational position with said spring further functions to provide the internal camera housing with said cushioning means; and
   said actuating means further includes a hand lever connected to said cable to pull said cable and retracting said internal camera housing.

6. In an Off Road Vision Enhancement System for a multi-wheeled vehicle as set forth in claim 1 and further comprising:
   said protection means that that covers the internal camera housing in the retracted position includes doors on the lower end of said external protective housing that overlap at least a portion of said internal camera housing in the retracted position and are moveable to an open position when said internal camera housing is moved to the operational extended position.

7. In an Off Road Vision Enhancement System for a multi-wheeled vehicle as set forth in claim 6 and further comprising:
   said doors are spring biased to a closed position that protects said internal camera housing in its retracted position and biases said doors to slide against said internal camera housing to remove debris there from when the internal camera housing is retracting.

8. In an Off Road Vision Enhancement System for a multi-wheeled vehicle as set forth in claim 1 and further comprising:
   said actuating mean is a powered actuator that is providing with an operational control in said vehicle.

9. A multi-wheeled vehicle having front and rear wheels capable of traversing harsh terrain including an Off Road Vision Enhancement System comprising:
   an external protective housing connected to an under surface of said multi-wheeled vehicle between said front and rear wheels in a location to view said front and rear wheels with the terrain adjacent thereto under the vehicle and said under surface of said multi-wheeled vehicle;
   an internal camera housing retractably mounted within said external protective housing;
   at least one camera located within the internal camera housing adjacent a window in said internal camera housing;
   an actuating means for moving the internal camera housing from a retracted position where it is protected within said external protective housing to an extended operational position where said Off Road Vision Enhancement System can view the relative position of said front and rear wheels of said multi-wheeled vehicle and the terrain underneath said multi-wheeled vehicle over which it is traversing;
   protection means connected to said external protective housing to protect said internal camera housing from shocks, debris and heat that includes a resilient shock resistant, heat resistant material bonded to an internal surface of the external housing which is able to withstand the heat of fire and explosions that forms a guide and shock absorption shield for said internal camera housing, the protection means further includes means to cover at least a portion of said internal camera housing in the retracted position to further protect the internal camera housing from the harsh environment underneath the vehicle and said protection mean further includes a cushion means between said internal camera housing and another internal surface of the external protective housing; and
   a display means located within said multi-wheeled vehicle for the displaying images sent by said at least one camera of the front and rear wheels and the terrain there between and underneath the vehicle, such that an operator of the multi-wheeled vehicle can properly maneuver said vehicle with the precise placement of the front and rear wheels on an obstacle, which is needed for efficient harsh terrain travel.

10. In a multi-wheeled vehicle including an Off Road Vision Enhancement System as set forth in claim 9 and further comprising:
said at least one camera is a night vision camera.

11. In a multi-wheeled vehicle including an Off Road Vision Enhancement System as set forth in claim 9 and further comprising:
said actuating means includes a cable connected to said internal camera housing and to an operator actuated means inside said multi-wheeled vehicle.

12. In a multi-wheeled vehicle including an Off Road Vision Enhancement System as set forth in claim 11 and further comprising:
said actuating means includes a spring located between said external protective housing and said internal camera housing that biases said internal camera housing to move from said protected position to said extended operational position.

13. In a multi-wheeled vehicle including an Off Road Vision Enhancement System as set forth in claim 11 and further comprising:
said actuating means further includes a spring located between said external protective housing and said internal camera housing, surrounding said cable and biases said internal camera housing to move from said protected position to said extended operational position; and
said actuating means further includes a hand lever connected to said cable to pull said cable and retracting said internal camera housing.

14. In a multi-wheeled vehicle including an Off Road Vision Enhancement System as set forth in claim 9 and further comprising:
said means to cover at least a portion of said internal camera housing in the retracted position includes doors that are spring biased to a closed position that protects said internal camera housing in its retracted position and biases said doors to slide against said internal camera housing to remove debris there from when the internal camera housing is retracting.

15. In a multi-wheeled vehicle including an Off Road Vision Enhancement System as set forth in claim 9 and further comprising:
said protection means comprises a resilient shock resistant, heat resistant material that further forms a guide for said internal camera housing.

16. In a multi-wheeled vehicle including an Off Road Vision Enhancement System as set forth in claim 9 and further comprising:
said actuating mean is a powered actuator that is providing with an operational control in said multi-wheeled vehicle.

* * * * *